United States Patent
Wang et al.

(10) Patent No.: US 7,844,801 B2
(45) Date of Patent: Nov. 30, 2010

(54) METHOD AND APPARATUS FOR AFFINITY-GUIDED SPECULATIVE HELPER THREADS IN CHIP MULTIPROCESSORS

(75) Inventors: Hong Wang, San Jose, CA (US); Perry H. Wang, San Jose, CA (US); Jeffery A. Brown, Bay Point, CA (US); Per Hammarlund, Hillsboro, OR (US); George Z. Chrysos, Milford, MA (US); Doron Orenstein, Haifa (IL); Steve Shih-wei Liao, San Jose, CA (US); John P. Shen, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 358 days.

(21) Appl. No.: 10/632,431

(22) Filed: Jul. 31, 2003

(65) Prior Publication Data

US 2005/0027941 A1     Feb. 3, 2005

(51) Int. Cl.
*G06F 7/38* (2006.01)
*G06F 9/00* (2006.01)
*G06F 9/44* (2006.01)

(52) U.S. Cl. .......................... 712/225; 712/10
(58) Field of Classification Search .............. 712/10
See application file for complete search history.

(56) References Cited

U.S. PATENT DOCUMENTS

| | | | |
|---|---|---|---|
| 6,138,208 A * | 10/2000 | Dhong et al. | 711/122 |
| 6,789,168 B2 * | 9/2004 | Jeddeloh | 711/122 |
| 2002/0055964 A1 * | 5/2002 | Luk et al. | 709/107 |
| 2003/0126365 A1 * | 7/2003 | Jamil et al. | 711/120 |
| 2004/0148491 A1 * | 7/2004 | Damron | 712/34 |
| 2004/0154012 A1 | 8/2004 | Wang et al. | |
| 2004/0154019 A1 | 8/2004 | Aamodt et al. | |
| 2005/0055541 A1 | 3/2005 | Aamodt et al. | |

OTHER PUBLICATIONS

Slipstream Execution Mode for CMP-Based Multiprocessors, Khaled Z. Ibrahim, Gregory T. Byrd, and Eric Rotenberg, 2002.*
Brown et. al, Speculative Precomputation on Chip Multiprocessors, Nov. 2002.*

(Continued)

*Primary Examiner*—Alford W Kindred
*Assistant Examiner*—Jesse R Moll
(74) *Attorney, Agent, or Firm*—David P. McAbee (57) ABSTRACT

Apparatus, system and methods are provided for performing speculative data prefetching in a chip multiprocessor (CMP). Data is prefetched by a helper thread that runs on one core of the CMP while a main program runs concurrently on another core of the CMP. Data prefetched by the helper thread is provided to the helper core. For one embodiment, the data prefetched by the helper thread is pushed to the main core. It may or may not be provided to the helper core as well. A push of prefetched data to the main core may occur during a broadcast of the data to all cores of an affinity group. For at least one other embodiment, the data prefetched by a helper thread is provided, upon request from the main core, to the main core from the helper core's local cache.

32 Claims, 8 Drawing Sheets

OTHER PUBLICATIONS

Solihin et al., "Prefetching in an Intelligent Memory Architecture Using a Helper Thread", Dec. 2001.*

Purser et al., "A Study of Slipstream Processors", 2000.*

Collin et al., "Speculative Precomputation: Long-range Prefetching of Delinquent Loads", 2001.*

H. Akkary and M. Driscoll, "A Dynamic Multithreading Processor", In *Micro-31*, Proceedings of the 31st Annual International Symposium on Microarchitecture, Nov. 30-Dec. 2, 1998 pp. 226-236.

J. G. Steffan, C. B. Colohan, A. Zhai, and T. C. Mowry, "A Scalable Approach to Thread-level Data Speculation", In *ISCA-27*, Proceedings of the 27th Annual International Symposium on Computer Architecture, Jun. 2000, pp. 1-12.

J. G. Steffan, C. B. Colohan, A. Zhai, and T. C. Mowry,. Improving Value Communication for Thread-level Speculation. In *HPCA-8*, Proceedings of the 8th Annual International Symposium on High-Performance Computer Architecture, Feb. 2-6, 2002, pp. 65-75.

L. Hammond, M. Willey, and K. Olukotun, "Data Speculation Support for a Chip Multiprocessor", In *ASPLOS-VIII*, Proceedings of the 8th Annual International Conference on Architectural Support for Programming Languages and Operating Systems, Oct. 1998, pp. 58-69.

V. Krishnan and J. Torrellas, "The Need for Fast Communication in a Hardware-Based Speculative Chip Multiprocessors", in *PACT-99*, Proceedings for the 1999 International Conference on Parallel Architectures and Compliation Techniques, Oct. 1999, p. 24.

C. K. Luk, Tolerating Memory Latency through Software-Controlled Pre-Execution in Simultaneous Multithreading Processors, In *28th ISCA*, International Symposium on computer Architecture, Jun. 2001, p. 24.

T. Moshovos, D. Pnevmatikatos, A. Baniasadi, "Slice Processors: An Implementation of Operation-Based Prediction", Proceedings of the 15th Annual International Conference on Supercomputing, Italy, Jun. 2001, pp. 321-334.

*Speculative Precomputation on Chip Multiprocessors*, Jeffery A. Brown, Hong Wang, George Chrysos, Perry H. Wang, John P. Shen, at the *6th Workshop on Multithreaded Execution, Architecture, and Compilation (MTEAC-6)*, Nov. 2002.

M. Annavaram, J. Patel, E. Davidson. "Data Prefetching by Dependence Graph Precomputation". In *28th Annual International Symposium on Computer Architecture*, Jul. 2001.

J. Collins, D. Tullsen, H. Wang, J. Shen, "Dynamic Speculative Precomputation". In *Micro 34*, Proceedings of the 34th Annual International symposium on Microarchitecture, Dec. 2001, pp. 306-317.

H. Wang, P. Wang, R. D. Weldon, S. Ettinger, H. Saito, M. Girkar, S. Liao, J. Shen. "Speculative Precomputation: Exploring the use of Multithreading for Latency". In *Intel Technology Journal*, vol. 6, Issue on Hyper-threading, Feb. 2002.

P. Wang, H. Wang, J. Collins, E. Grochowski, R. Kling, J. Shen. "Memory Latency-Tolerance Approaches for Itanium Processor: Out-of-order Execution vs. Speculative Precomputation". In Proceedings of the 8th Annual *IEEE HPCA* International Symposium on High-Performance Computer Architecture, Feb. 2002.

C. Zilles and G. Sohi. "Execution-Based Prediction Using Speculative Slices". In *ISCA*, Proceedings of the 28th Annual International Symposium on Computer Architecture, Sweden, Jul. 2001, pp. 2-13.

S. Liao, P. Wang, G. Hoflehner, D. Lavery, J. Shen, "Post-Pass Binary Adaptation for Software-Based Speculative Precomputation", In *PLDI*, ACM Conference on Programming Language Design and Implementation, Jun. 2002.

* cited by examiner

METHOD AND APPARATUS FOR AFFINITY-GUIDED SPECULATIVE HELPER THREADS IN CHIP MULTIPROCESSORS

BACKGROUND

1. Technical Field

The present disclosure relates generally to information processing systems and, more specifically, to prefetching of data via speculative helper threads in chip multiprocessors.

2. Background Art

In order to increase performance of information processing systems, such as those that include microprocessors, both hardware and software techniques have been employed. On the hardware side, microprocessor design approaches to improve microprocessor performance have included increased clock speeds, pipelining, branch prediction, superscalar execution, out-of-order execution, and caches. Many such approaches have led to increased transistor count, and have even, in some instances, resulted in transistor count increasing at a rate greater than the rate of improved performance.

Rather than seek to increase performance through additional transistors, other performance enhancements involve software techniques. One software approach that has been employed to improve processor performance is known as "multithreading." In software multithreading, an instruction stream is split into multiple instruction streams, or "threads", that can be executed concurrently.

In one approach, known as time-slice multithreading or time-multiplex ("TMUX") multithreading, a single processor switches between threads after a fixed period of time. In still another approach, a single processor switches between threads upon occurrence of a trigger event, such as a long latency cache miss. In this latter approach, known as switch-on-event multithreading, only one thread, at most, is active at a given time.

Increasingly, multithreading is supported in hardware. For instance, processors in a multi-processor system, such as a chip multiprocessor ("CMP") system, may each act on one of the multiple threads concurrently. In another approach, referred to as simultaneous multithreading ("SMT"), a single physical processor is made to appear as multiple logical processors to operating systems and user programs. In SMT, multiple threads can be active and execute concurrently on a single processor without switching. That is, each logical processor maintains a complete set of the architecture state, but many other resources of the physical processor, such as caches, execution units, branch predictors, control logic and buses are shared. With CMP and SMT approaches, the instructions from multiple threads execute concurrently and may make better use of shared resources than TMUX multithreading or switch-on-event multithreading.

BRIEF DESCRIPTION OF THE DRAWINGS

The present invention may be understood with reference to the following drawings in which like elements are indicated by like numbers. These drawings are not intended to be limiting but are instead provided to illustrate selected embodiments of a method, apparatus and system for facilitating data prefetching via speculative helper threads in chip multiprocessors.

DETAILED DESCRIPTION

Described herein are selected embodiments of a system, apparatus and methods for facilitating data prefetch via speculative helper threads in chip multiprocessors. In the following description, numerous specific details such as processor types, cache configurations, control flow ordering, and speculative precomputation techniques have been set forth to provide a more thorough understanding of the present invention. It will be appreciated, however, by one skilled in the art that the invention may be practiced without such specific details. Additionally, some well-known structures, circuits, and the like have not been shown in detail to avoid unnecessarily obscuring the present invention.

Figure 1:
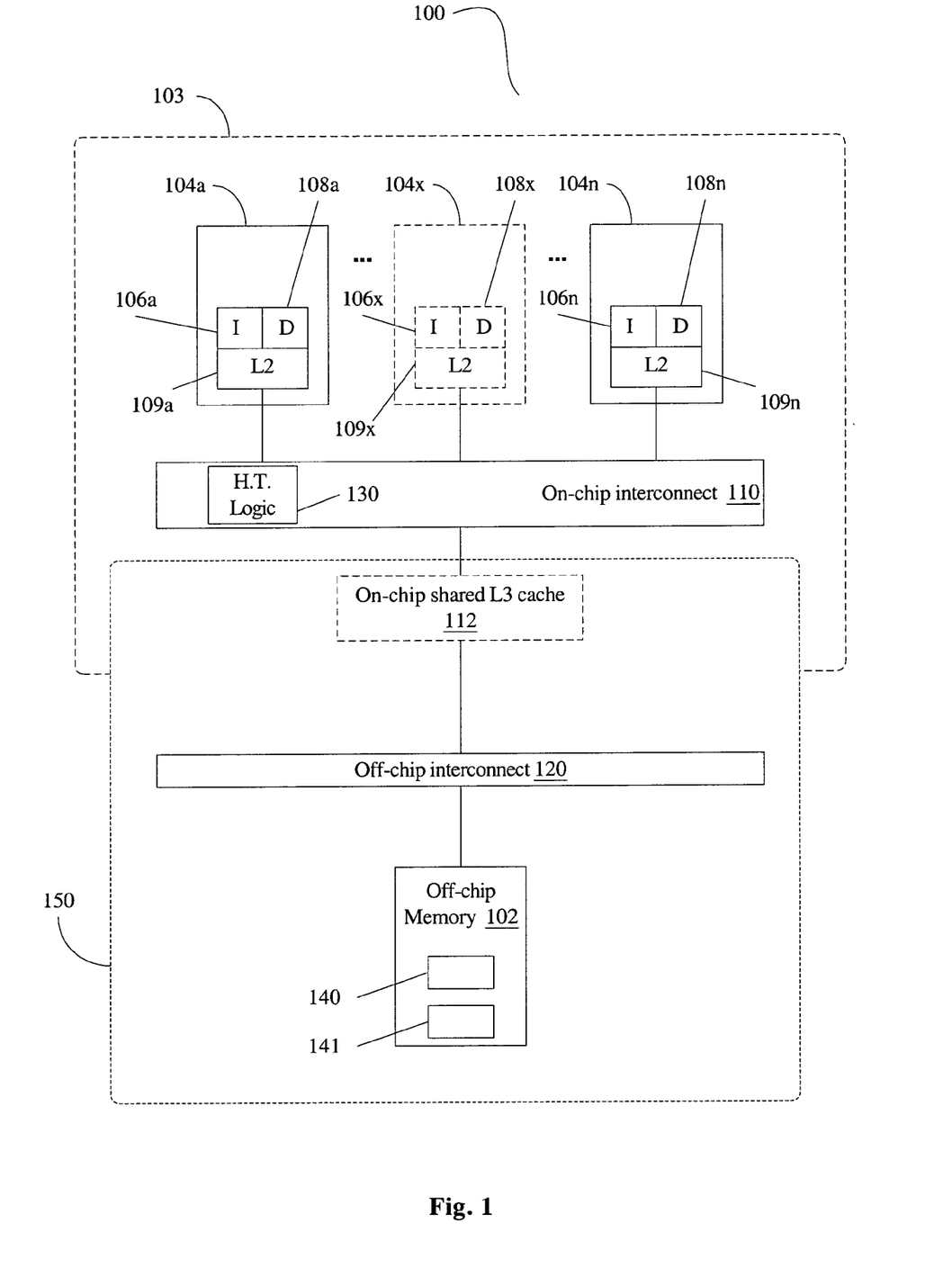
FIG. 1 is a block diagram illustrating a first embodiment of a system capable of utilizing disclosed techniques.

FIG. 1 illustrates at least one embodiment of a chip multiprocessor (CMP) system 100 that may perform data prefetching via speculative helper threads. The system includes two or more processor cores 104a-104n in a single chip package 103. (The optional nature of processors 104 in excess of two such processors is denoted by dotted lines and ellipses in FIG. 1). Each core 104 includes a private level one (L1) data cache 106 and a private L1 instruction cache 108. For at least one embodiment, the L1 caches 106, 108 are 16K 4-way set-associative caches.

In addition, each core 104 may also include a private unified second level 2 ("L2") cache 109. For at least one embodiment, the L2 caches 109 are 256K 4-way set-associative caches. For at least one embodiment, the private L1 data cache 106 and private L1 instruction cache 108 are write-through caches. Accordingly, the private L2 cache 109 is responsible for participating in cache coherence protocols, such as, for example, a write-invalidate type of cache coherence protocol. Because the private caches 109 for the multiple cores 104a-104n are used with shared memory such as shared memory, system 150, the cache coherence protocol is used to detect when data in one core's cache should be discarded or replaced because another core has updated that memory location.

FIG. 1 illustrates that the system 100 also includes an on-chip interconnect 110 that manages communication among the processor cores 104a-104n. The processor cores 104a-10n are connected to a shared memory system 150. The memory system 150 includes an off-chip memory 102. The memory system 150 may also include an optional shared on-chip third level (L3) cache 112. The optional nature of the shared on-chip L3 cache 112 is denoted by broken lines. For those embodiments that include optional shared L3 cache 112, each of the processor cores 104a-104n may access information stored in the L3 cache 112 via the on-chip interconnect 110. For at least one embodiment, the L3 cache 112 is thus shared among the processor cores 104a-104n of the CMP system 100.

The caches 106, 108, 109, 112 may be any type of cache. For at least one embodiment, the caches are set-associative and are non-blocking. The L3 cache 112, for instance, may be a 3072 KB 12-way set associative unified cache that stores both data and instructions and supports up to 16 concurrent in-flight cache misses.

The on-chip interconnect 110 is, for at least one embodiment, a bus-based interconnect providing symmetric and uniform access latency among the processor cores 104a-104n. For embodiments that include shared on-chip L3 cache 112, the interconnect 110 provides access to the L3 cache 112 similar to that provided by uniform memory access (UMA) interconnects in shared memory multiprocessor systems. One of skill in the art will recognize that, in at least one alternative embodiment, the interconnect may be based on a ring topology that provides UMA-like access scenarios. Furthermore, either bus or ring topologies may be configured for an on-chip interconnect 110 that provides asymmetric access scenarios similar to those provided by non-uniform memory access (NUMA) interconnects.

FIG. 1 further illustrates that the system 100 includes an off-chip interconnect 120. The off-chip interconnect 120 connects, and facilitates communication between, the processor cores 40a-40n of the chip package 103 and an off-core memory 102. The off-core memory 102 is a memory storage structure to store data and instructions.

Figure 2:
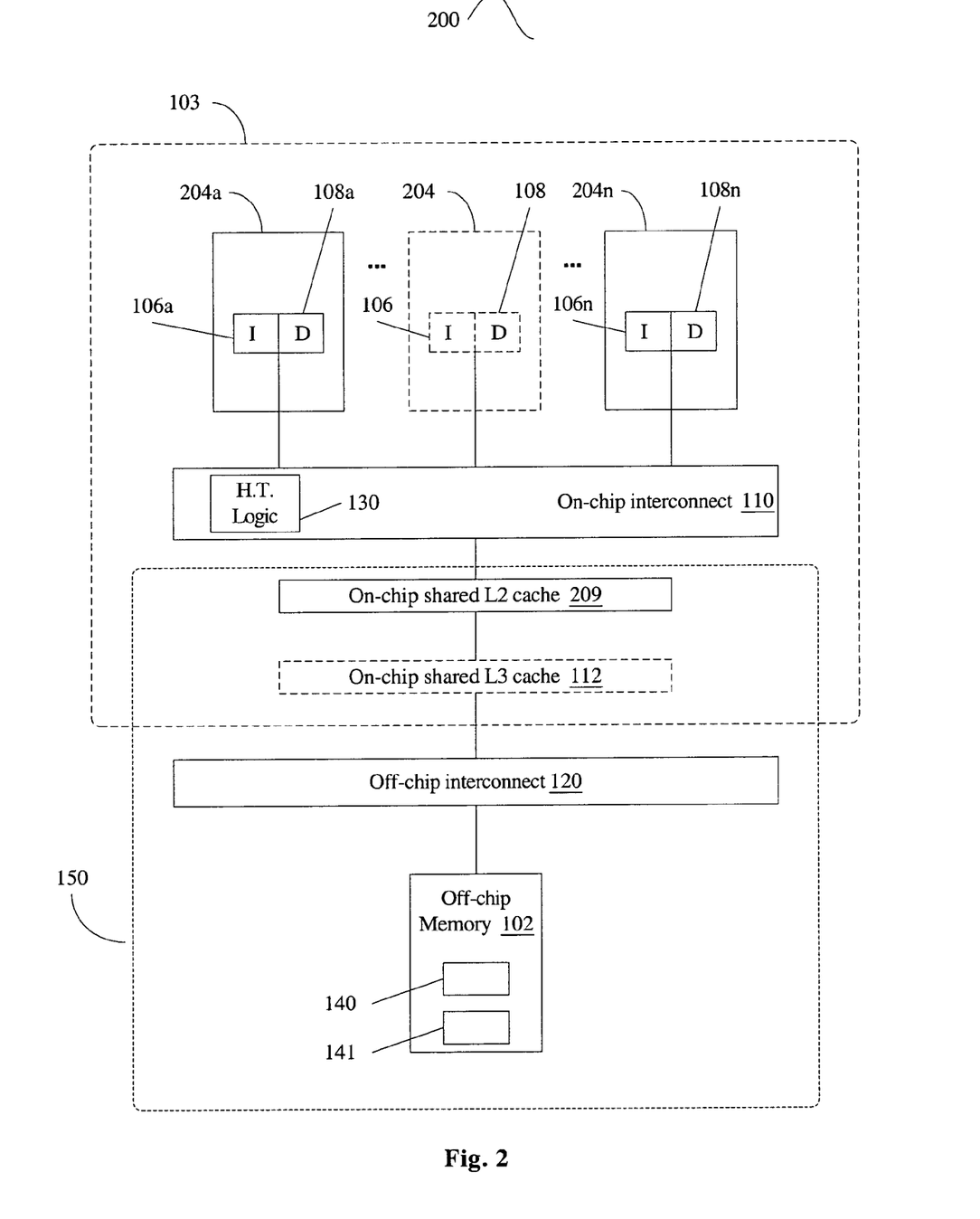
FIG. 2 is a block diagram illustrating a second embodiment of a system capable of utilizing disclosed techniques.

FIG. 2 illustrates at least one alternative embodiment 200 of a CMP system. The system illustrated in FIG. 2 includes many of the same features of FIG. 1. Accordingly, like elements among FIG. 1 and FIG. 2 are indicated by like numbers.

FIG. 2 illustrates that the processor cores 204a-204n of system 200 do not include private L2 caches (such as L2 caches 109a-109n illustrated in FIG. 1). Instead, the processor cores 204a-204n of the FIG. 2 system share a single L2 cache 209 and may also share an optional shared L3 cache 112.

CMP systems, such as the systems 100, 200 illustrated in FIGS. 1 and 2, provide for running multiple threads via concurrent thread execution on multiple cores. In such systems, one or more cores may be idle during execution of a single-threaded application (referred to herein as a "main thread"). Utilizing otherwise idle cores to speculatively parallelize the single-threaded application can increase speed of execution for the non-speculative main thread.

The otherwise idle cores are utilized to execute speculative threads, referred to as "helper threads", concurrently with the main thread. The helper threads prefetch data into a cache on behalf of the non-speculative main thread. These speculative helper threads attempt to trigger cache misses far in advance of cache accesses in the main thread so that memory miss latency may be masked from the main thread.

The otherwise idle cores are thus used to prefetch data for the single-threaded main thread that is being "helped." These helper-induced prefetches may help speed the execution time of the main thread by helping to provide data into the cache accessed by the main thread by the time the main thread needs the data.

Accordingly, CMP systems 100 and 200 each consist of n processor cores 104a-104n and 204a-204n, respectively. For purposes of this disclosure, n may be any integer >1, including 2, 4 and 8. For each embodiment 100, 200, the processor cores (104a-104n or 204a-204n, respectively) share a single shared memory system 150. It should be noted that, for each embodiment 100, 200, it is assumed that a latency mode is supported to allow a single non-speculative thread (the main thread) to persistently occupy one CMP core 104, 204 throughout its execution. Meanwhile, the remaining CMP cores 104x-104n are either idle or execute speculative helper threads to perform data prefetching for the main thread. In this manner, data fetching for a main thread may be accelerated by a speculative helper thread that executes concurrently on a different processor core 104 than the main thread.

As used herein, the term "thread" is intended to refer to a set of one or more instructions. The instructions of a thread are executed by a processor, such as processors 104, 204. Processors that provide hardware support for execution of only a single instruction stream are referred to as single-threaded processors. Processors that provide hardware support for execution of multiple concurrent threads are referred to as multi-threaded processors. For multi-threaded processors, each thread is executed in a separate thread context, where each thread context maintains register values, including an instruction counter, for its respective thread. While the embodiments of CMP systems 100, 200 discussed herein refer to only a single thread per processor 104, 204, it should not be assumed that the disclosures herein are limited to single-threaded processors. The techniques discussed herein may be employed in any CMP system, including those that include multiple multi-threaded processors in a single chip package 103 (FIG. 1).

The data prefetching performed by helper threads is effective when the CMP core that executes the helper thread and the CMP core that executes the main thread share a data storage memory structure, such as a cache hierarchy. However, typical CMP systems usually provide a reduced degree of cache sharing between cores than is traditionally provided between logical processors of an SMT system. In other words, rather than sharing data in a cache at the closet level of the memory hierarchy to the processor core, CMP systems usually provide for private caches 106, 108, 109 close to the cores and for sharing of caches 112, 209 in portions of the memory hierarchy that are farther away from the CMP processor cores. As used herein, a cache that is closer to a CMP processor core is referred to as a "lower" cache and a cache that is farther from a core and is closer to memory is referred to as a "higher" cache.

Communications from helper threads on one core to a main thread running on another core may therefore suffer a higher latency than communications among threads in an SMT environment, or other type of system where thread contexts share data in a lower cache close to the core. This increased latency may reduce the performance benefit that could otherwise be realized from helper threading.

It would be beneficial to employ techniques within a CMP multithreading system that would improve efficiency of data sharing among cores in order to provide enhanced helper thread prefetching capabilities. Embodiments disclosed herein address these and other concerns related to data prefetching via speculative helper threads on CMP systems.

Figure 3:
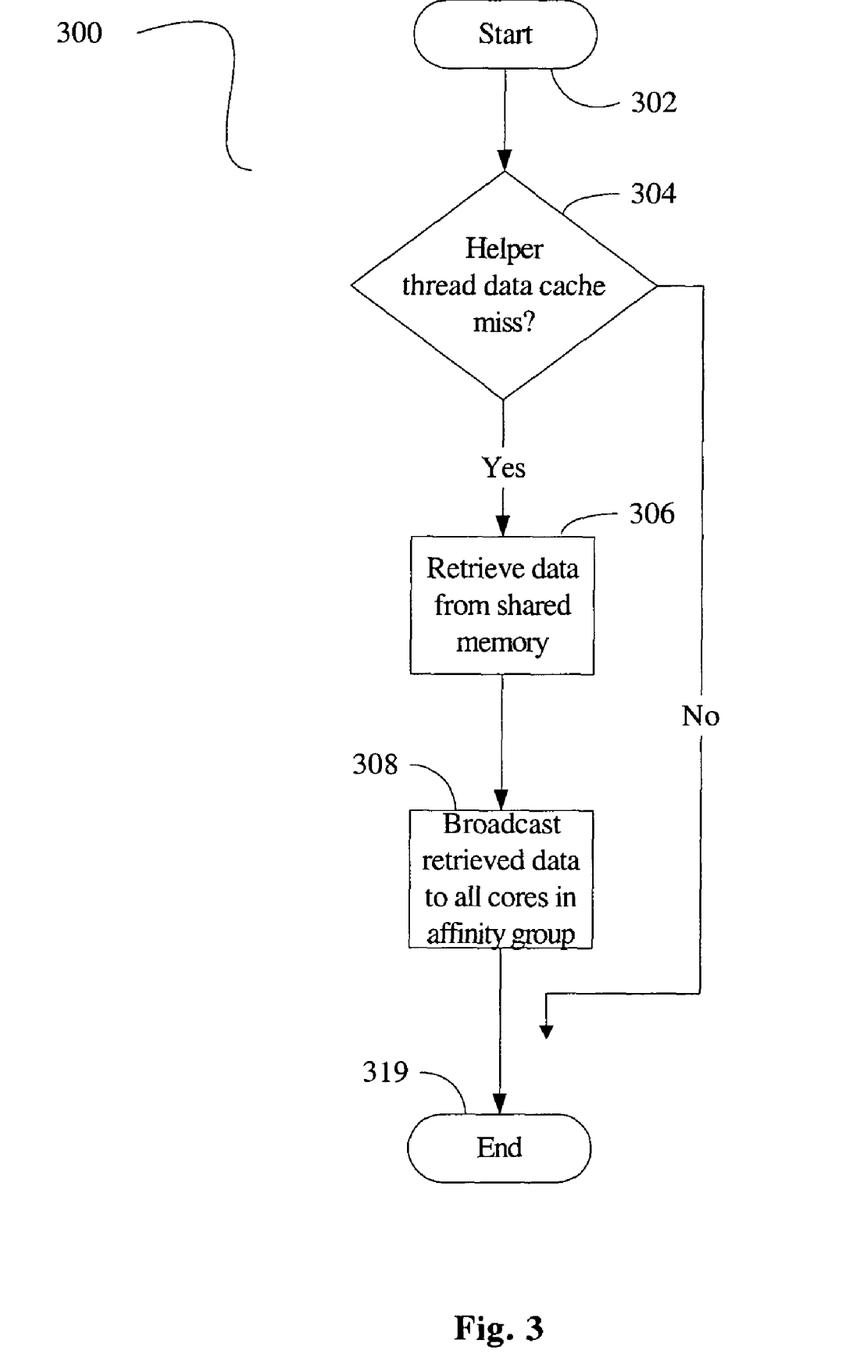
FIG. 3 is a flowchart illustrating at least one embodiment of a method for performing affinity-based return data multicast data prefetching via a helper thread in a CMP system.
Figure 5:
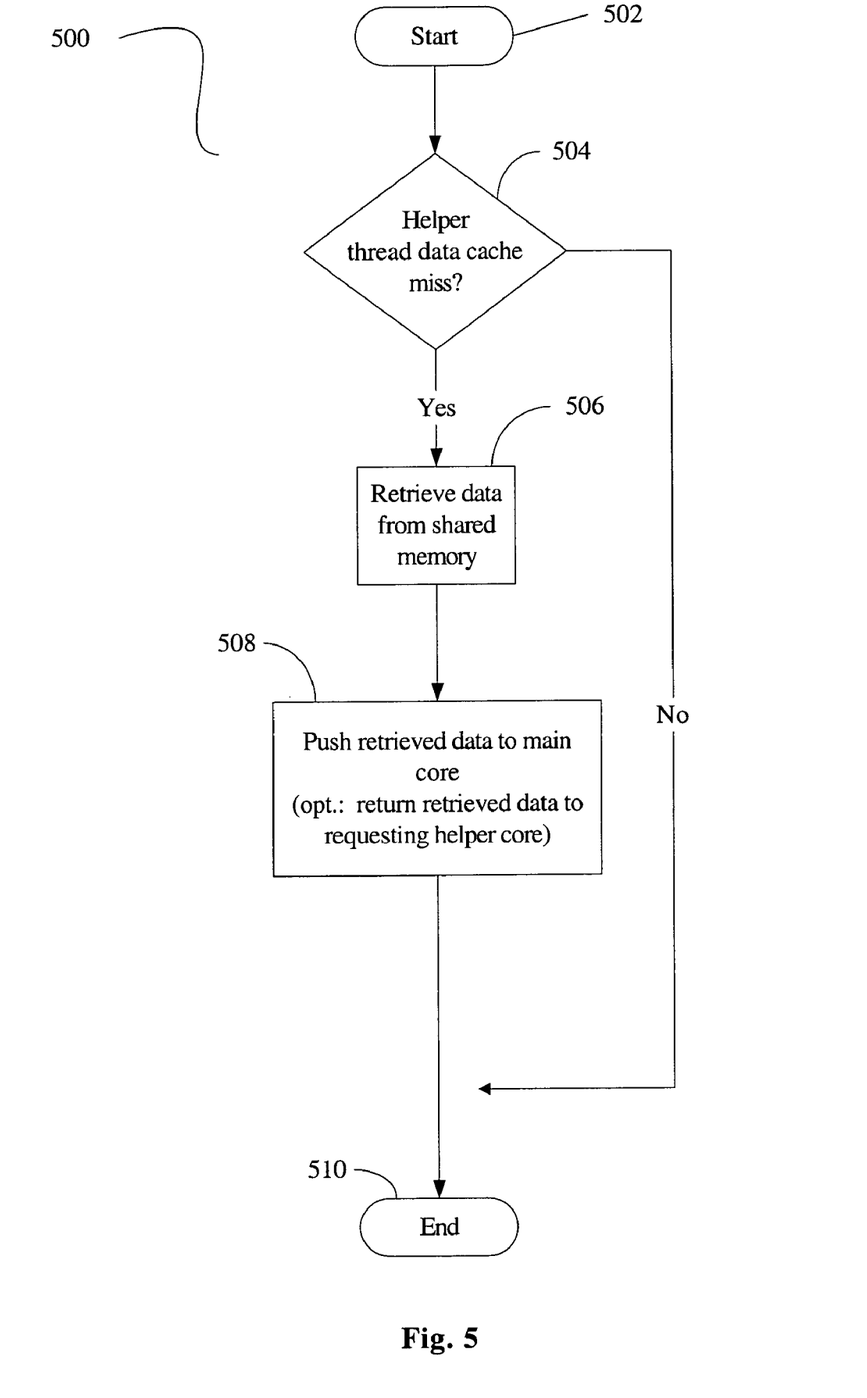
FIG. 5 is a flowchart illustrating at least one embodiment of a method for performing return data unicast data prefetching via a helper thread in a CMP system.
Figure 7:
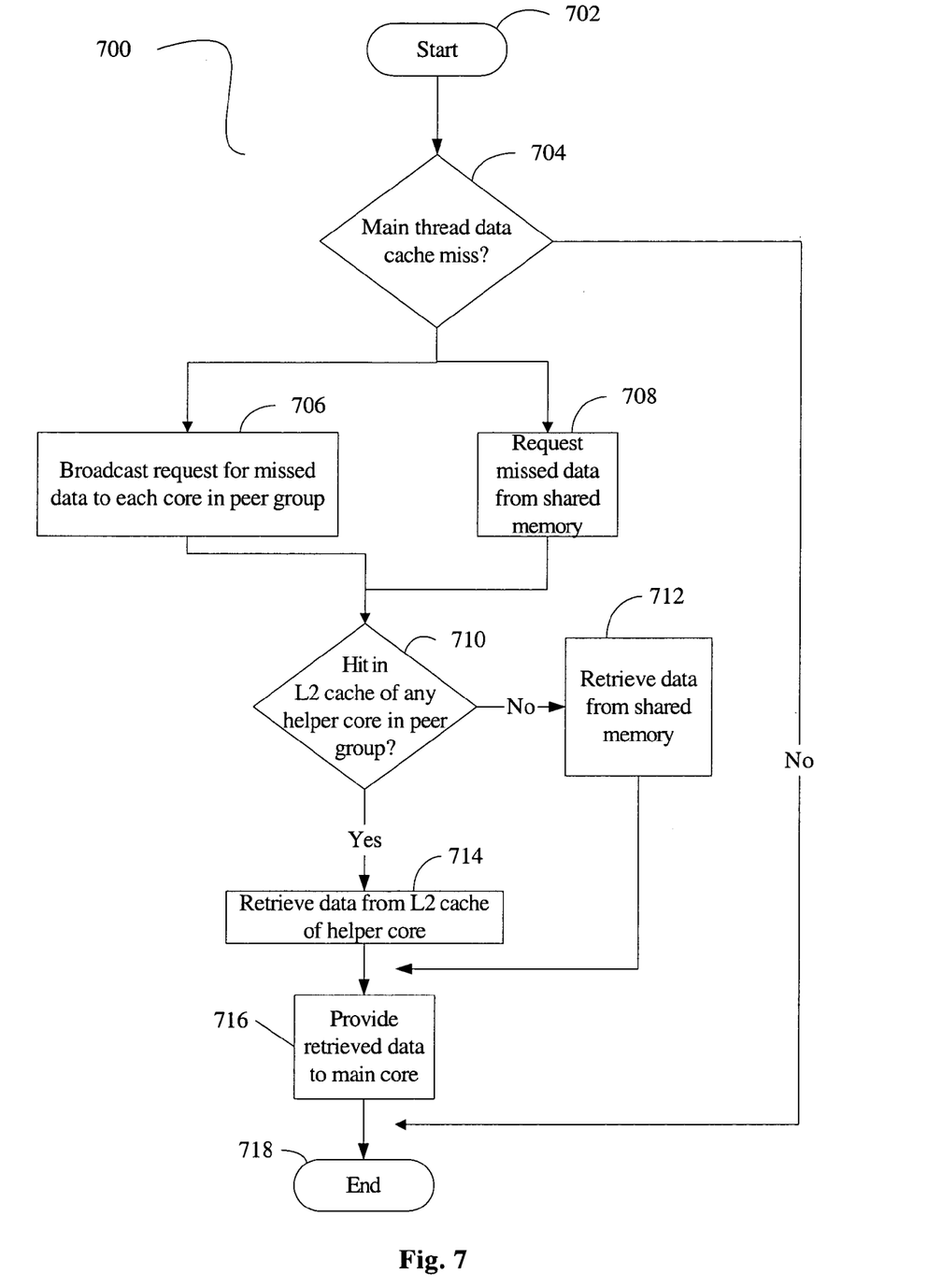
FIG. 7 is a flowchart illustrating at least one embodiment of a method for performing cross-feed data prefetching from a helper thread in a CMP system.

FIGS. 3, 5 and 7 illustrate methods 300, 500, 700, respectively, for performing data prefetching via helper threads in a CMP system. For at least one embodiment of each of the methods 300, 500, 700, the latency associated with cache misses in a main thread is decreased through the use of a helper thread that executes concurrently with the main thread. The helper thread is a speculative prefetch thread to perform a memory prefetch for the main thread. For at least one embodiment, a main thread is executed on one core of the CMP system (referred to as the main core) while the helper thread is executed by a second core of the same CMP system (referred to as a helper core).

Each of the methods 300, 500, 700 performs prefetching of data for the main core (i.e., the core that is executing the main thread). Each method 300, 500, 700 provides a decrease in load latency for the main thread by prefetching data into a cache that is closer than the shared memory system 150 (FIG. 1) to the main core. As is set forth in the discussion below, the methods 300, 500, 700 thus prefetch data into the private data cache 108 of the main core so that the main core need not suffer the latency associated with retrieving data from the shared memory system 150 for data that would otherwise cause a cache miss in the private data cache 108 for the main core. It is assumed that, for at least one embodiment of each of the methods 300, 500, 700, that data written to L2 cache after servicing an L2 cache miss is also filled to the L1 data cache 108.

Figure 4:
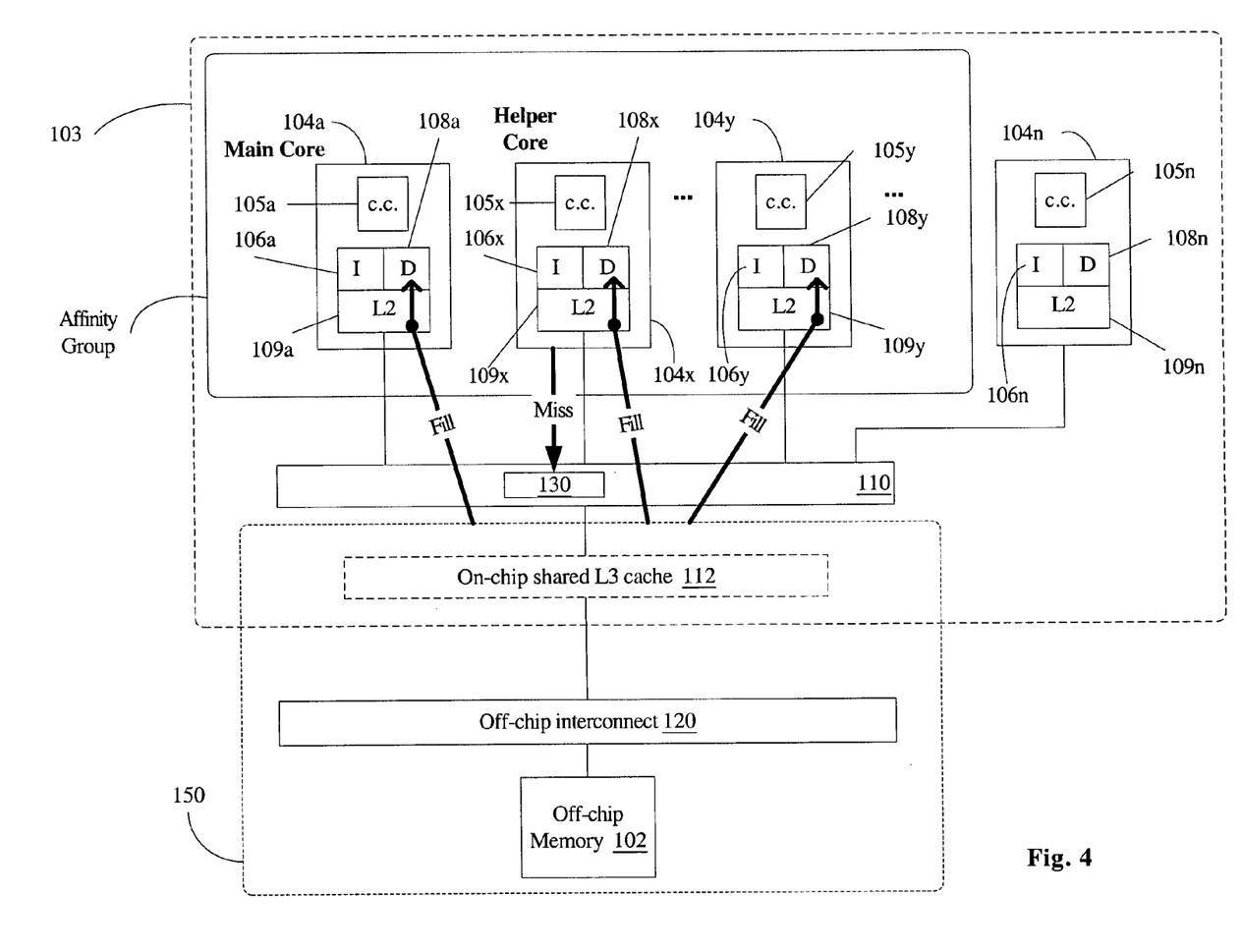
FIG. 4 is a data flow diagram illustrating the flow of prefetched data according to the prefetch method illustrated in FIG. 3

FIG. 3 illustrates a method 300 for performing CMP data prefetching according to an affinity-based "return data multicast" approach. FIG. 4 is a data flow diagram illustrating the flow of data prefetched by a helper thread according to the method 300. FIGS. 3 and 4 are referenced together in the following discussion of the method 300. For at least one embodiment, the method 300 is performed by helper threading logic 130.

Generally, FIGS. 3 and 4 illustrate that, when a miss in a helper core's 104x private L2 cache 109x is serviced by a shared memory system (such as memory system 150), the result is multicast to all other cores in an affinity group of interest. As a result of the multicast to all cores in the affinity group, the data prefetched by a helper core 104x is injected (also referred to as "pushed") into the private data caches for all other cores in the affinity group.

The affinity group includes the main core 104a and one or more helper cores 104x-104y (including the helper core that suffered the cache miss). The affinity group may thus include all, or a subset, of the processor cores 104a-104n in a chip package 103. For the illustrated embodiment illustrated in FIG. 4, the affinity group includes a subset (x) of the cores 104a-104n in the chip package 103, where x=3. For at least one embodiment, the grouping of cores together into an affinity group is based on topological affinity, such as adjacency and the hierarchy of interprocessor communication. Thus, for at least one embodiment, cores in an affinity group are topologically adjacent to each other. However, for alternative embodiments the cores in an affinity group may topologically remote from one or more other cores in the affinity group.

FIG. 3 illustrates that processing for method 300 begins at block 302 and proceeds to block 304. At block 304 the method 300 determines that a helper thread has attempted to execute a load instruction, or other memory instruction, but has suffered a cache miss in the helper core's private L2 cache. As used herein, a cache "miss" occurs when the data associated with a load instruction or other memory instruction is present in neither the private data caches 108x, 109x nor in the L2 cache 109x of the helper core 104x. If a miss has not occurred, then the helper core 104x does not need to retrieve the data from outside the core 108x and processing thus ends at block 319.

If, however, a cache miss is detected at block 304 then processing proceeds to block 306. At block 306, the requested data is retrieved from a shared memory location. For an embodiment that includes a shared L3 cache 112, the requested data is retrieved from the L3 cache 112 if the data is present in the L3 cache 112. If the requested data is not present in the L3 cache 112, then the data is retrieved 306 from off-chip memory 102. Processing then proceeds to block 308.

For an embodiment that does not include an L3 cache 112, the requested data is retrieved 306 from off-chip memory 102. Processing then proceeds to block 308.

For at least one alternative embodiment, where the shared memory system 150 does not include a shared L3 cache 112, the data is retrieved 306 from another socket's cache. That is, for such embodiment the cores 104a-104y of the affinity group are implemented as a shared cache-coherent multi-socket system such that fill data may be supplied by the cache of a socket other than the socket that incurred the cache miss. Processing then proceeds to block 308.

When the shared L3 cache 112 or another socket services an L2 cache miss from one of the cores 104a-104n, the resulting fill is broadcast at block 308 to all cores in the affinity group. After the retrieved data is broadcast to all cores 104a-104n of the affinity group, processing ends at block 319.

Although not illustrated in FIG. 3, it is assumed that the cache controller 105 for each of the cores 1-4a-104n of the affinity group accept and process the unsolicited fill data that was broadcast at block 308. The cache controllers 105 update their respective private L2 caches 109, and later update their private L1 data caches 108, with the fill value. For such embodiment, it is assumed that the cache controller 105 for each of the cores in the affinity group remains active even when the core is otherwise idle.

The push mechanism implemented via the method 300 illustrated in FIG. 3 allows the effects of a helper thread prefetch to be realized in the private caches 109a, 108a of the main core 104a. In sum, a memory instruction, such as a delinquent load instruction, is preexecuted by a helper thread. The data retrieved from a shared memory location in response to a cache miss while executing the memory instruction is pushed to the private cache 109 of the main core. As used herein, a "delinquent" memory instruction is a memory access instruction, such as a load instruction, for which a cache miss is anticipated, absent prefetching, in the main thread.

The method 300 also provides for private cache warm-up for helper cores of the affinity group. This warm-up provides that intermediate data needed by the helper core may be pushed to the private cache of the helper core in order to avoid a cache miss. Cache warm-up may minimize stalls due to cache misses in the helper core, thus speeding execution of a helper thread being executed on the helper core. The method 300 may thus enhance timeliness of prefetching by allowing helper threads to run further ahead of the main thread.

Figure 6:
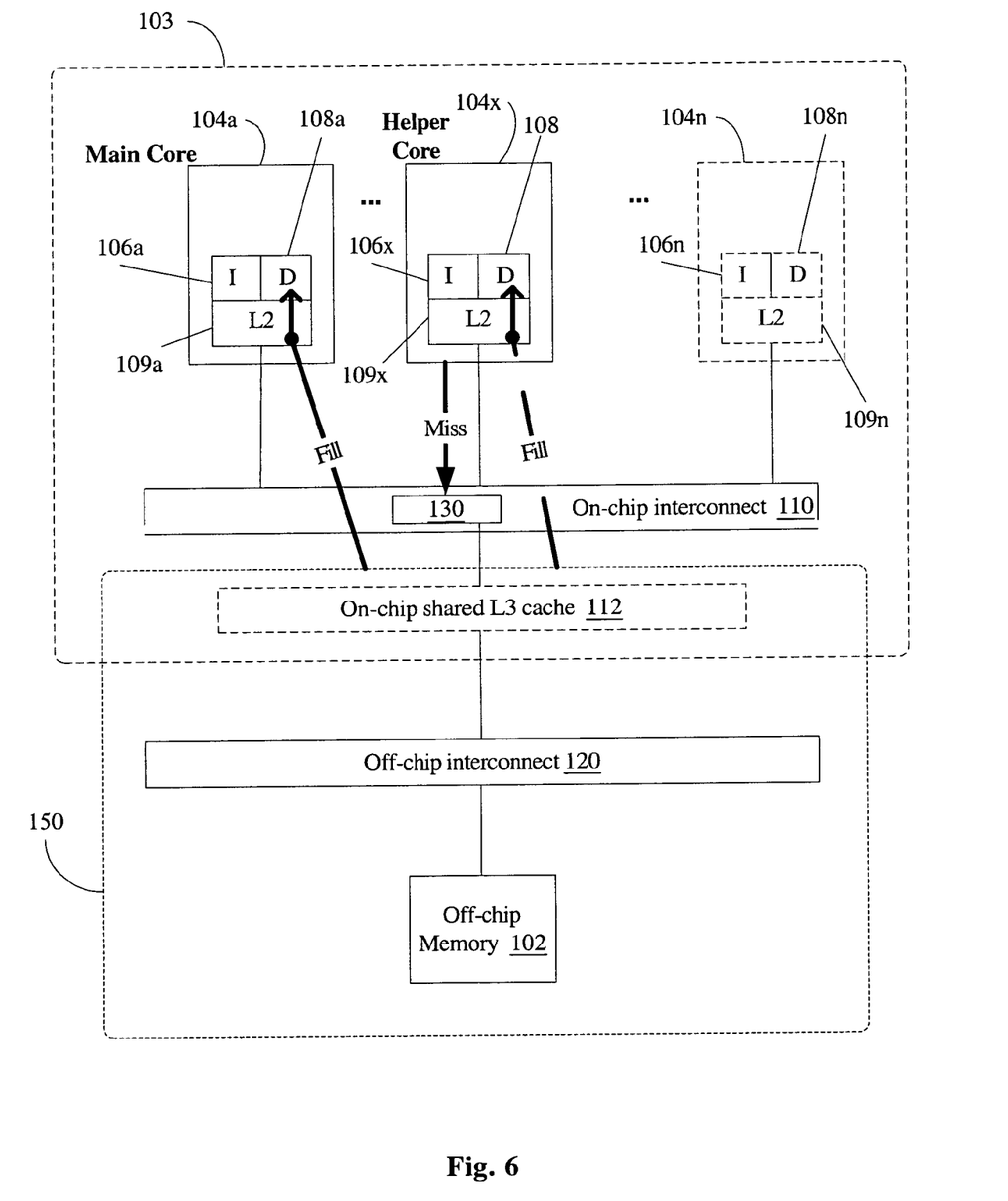
FIG. 6 is a data flow diagram illustrating the flow of prefetched data according to the prefetch method illustrated in FIG. 5.

FIG. 5 illustrates a method 500 for performing CMP data prefetching according to a "return data unicast" approach. FIG. 6 is a data flow diagram illustrating the flow of data prefetched by a helper thread according to the method 500. FIGS. 5 and 6 are referenced together in the following discussion of the method 500. For at least one embodiment, the method 500 is performed by helper threading logic 130.

According to the method 500 illustrated in FIG. 5, prefetched data from one core may be returned unsolicited to the private cache of one other core. In particular, fill data associated with prefetches issued by a helper core is injected into private cache of the main core 104a. For at least one embodiment, the prefetched data is also returned to the prefetching core as well. For an embodiment where the requested fill data is provided only to the main core and is not provided to the requesting helper core, the method 500 assumes that the on-chip interconnect 130 supports a point-to-point interconnection network. In contrast to the broadcast method 300 discussed above, the unicast method 500 specifically targets the main core 104a. Accordingly, for at least one embodiment the logical ensemble of the main core 104a and the helper cores 104x-104n constitute a virtual star network with the main core 104s at the center.

FIG. 5 illustrates that processing for the method 500 begins at block 502 and proceeds to block 504. At block 504 the method 500 determines that a helper thread has attempted to execute a load instruction, or other memory instruction, but has suffered a cache miss. If a cache miss has not occurred, then the helper core 104x does not need to retrieve the data from outside the core 108x and processing thus ends at block 510.

If, however, a cache miss is detected at block 504 then processing proceeds to block 506. At block 506, the requested data is retrieved from a shared memory location. For an embodiment that includes shared L3 cache 112, if the data is not available in the shared L3 cache 112, then the data is retrieved 506 from off-chip memory 102. Otherwise, the data is retrieved 506 from the shared L3 cache 112. Processing then proceeds to block 508.

For an embodiment that does not include shared L3 cache 112, the requested data is retrieved 506 from off-chip memory 102. Processing then proceeds to block 508.

For at least one other embodiment that does not include shared L3 cache 112, the cores 104a-104n are implemented as a shared cache-coherent multi-socket system. For such embodiment, the requested data is retrieved 506 from the private cache of another socket if it is available. If the requested data is not available in the private cache of another socket, it is retrieved 506 from off-chip memory 102. Processing then proceeds to block 508.

When the shared L3 cache 112 or another socket services an L2 cache miss from one of the cores 104a-104n, the resulting fill is pushed at block 508 to the main core 104a. In contrast to the fill broadcast 308 illustrated and discussed above in connection with FIG. 3, the broadcast 508 illustrated in FIG. 5 is asymmetric—the fill is not broadcast to every core in an affinity group. The prefetching transaction may thus be conceptualized as load data retrieval transaction where the helper core 104x is the producer of the fill data while the main core 104a is the consumer of the fill data.

FIG. 5 illustrates that, for at least one embodiment, the fill data retrieved from the L3 cache 112 or another socket is also provided to the helper core 104x that performed the prefetching. Returning of the requested fill data to the requesting helper core 104x is optional. That is, according to at least one embodiment of the FIG. 5 method, whenever a helper core incurs a miss into the shared memory system 150, the data return is only broadcast 508 to the main core 104a via a push mechanism and is not returned to the requesting helper core 104x.

Pushing 508 of the fill data requested by a helper core 104x to a private cache of the main core 104a need not necessarily be accomplished by a particular mechanism. Any manner of pushing the fill data to the main core, when the fill data was originally requested by a helper core, is contemplated.

For at least one embodiment, the pushing 508 of fill data to the main core 104a (and optionally to the requesting helper core 108x) is accomplished in the following manner. As with all of the prefetching methods 300, 500, 700 discussed herein, the helper thread running on the helper core computes the prefetch address of a delinquent load instruction (see discussion of p-slice computation, below). However, to support unicast prefetching method 500, the helper thread also computes a routing mask (also referred to as a navigation mask) for delivering a copy of the returned data to another core. For example, if the on-chip interconnect 130 supports a multi-cast mode, then the helper thread calculates a routing mask such that the fill data will be provided to a subset of the cores (either the helper core 104a only, or the helper core 104a and the requesting helper core 104x) via the existing multicast capabilities of the interconnect 130. The helper thread thus forges, as part of its precomputation tasks, the "return address" for the prefetch instruction to indicate that the fill data should be returned to the main core 104a.

FIG. 5 illustrates that, after the fill data is pushed to the main core 104a (and optionally provided to the requesting helper core 104x), processing ends at block 510.

Figure 8:
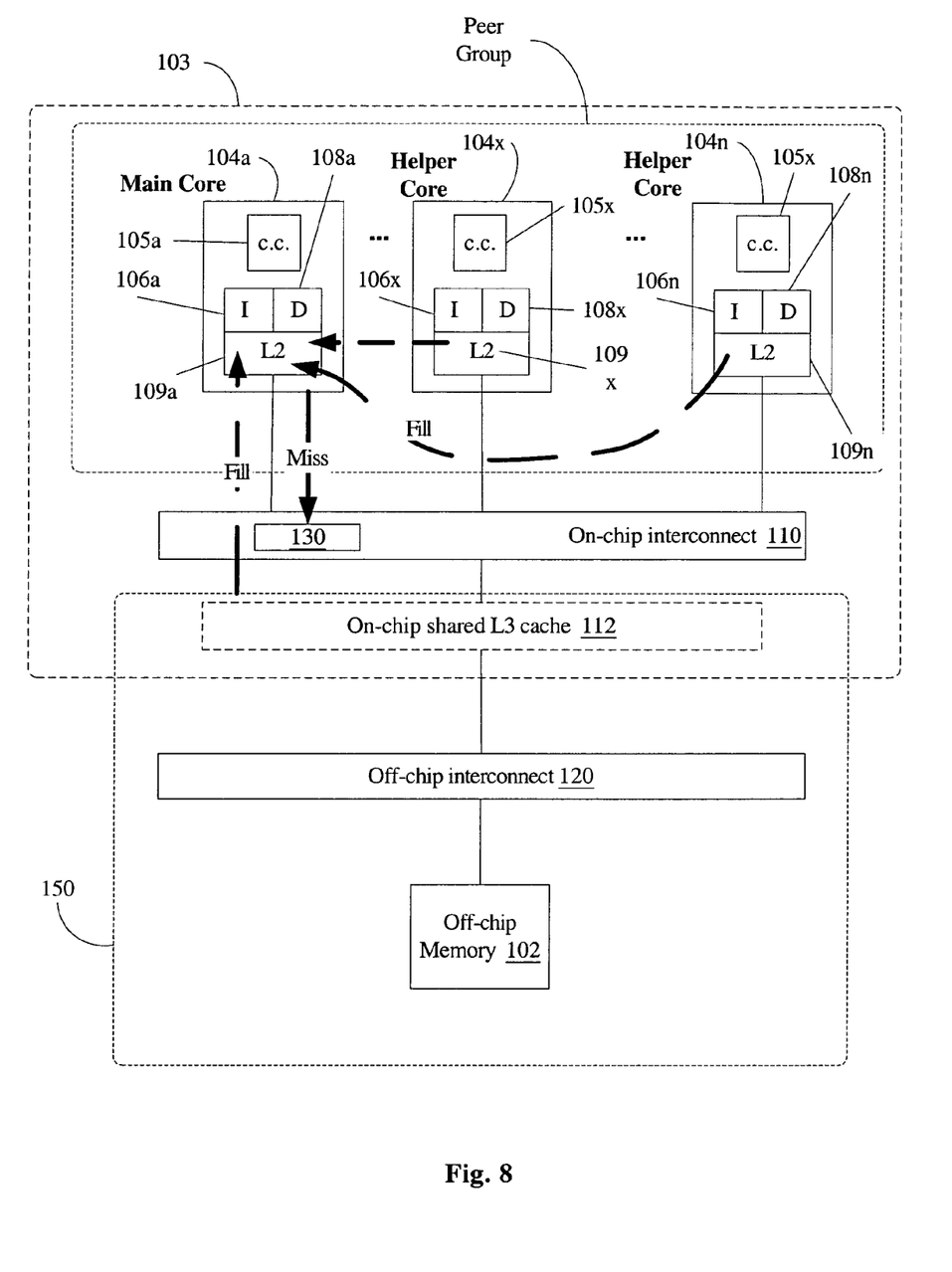
FIG. 8 is a data flow diagram illustrating the flow of prefetched data according to the prefetch method illustrated in FIG. 7.

FIG. 7 illustrates a method 700 for performing CMP data prefetching according to a "peer-core L2 cache cross-feeding" scheme. FIG. 8 is a data flow diagram illustrating the flow of prefetched data returned by a helper thread according to the method 700. For at least one embodiment, helper-threading logic 130 performs the method 700.

The peer-core L2 cache cross-feeding method for prefetching 700 is an on-demand prefetching scheme rather than a "push" scheme 300, 500 as discussed above in connection with FIGS. 3 and 5. In contrast to the push methods 300, 500, FIG. 7 illustrates a method whereby one core of a peer group submits a data request to a shared memory system 150 when the core incurs a private cache miss to a shared cache. According to the method 700, other active cores of the peer group may snoop the request and probe their private caches to determine if they have the requested data ready to share. If so, the peer core may opportunistically return the requested data if it has the requested data available in a private cache. In such case, the peer core replies to the request and sends the requested data to the requesting core that encountered the cache miss. One of skill in the art will understand that the core that incurs the cache miss may be any core in the peer group, and need not necessarily be the main core 104a as shown in FIG. 8.

FIG. 7 illustrates the processing for the method 700 begins at block 702 and proceeds to block 704. At block 704 it is determined whether any core 104 in a peer group has suffered a cache miss. If not, then data need not be retrieved from the shared memory system 150, and processing thus ends at block 718.

If, however, it is determined at block 704 that a cache miss has occurred for any peer core 104a-104n, processing proceeds to blocks 704 and 706 concurrently. At block 706, the data request (the delinquent load instruction) from the core 104a that suffered the cache miss is submitted to the interconnect 110 in such a manner that the request may be snooped by the other peer cores 108x-108n.

For at least one embodiment, the data request may be submitted 706 using "acquire" semantics for the delinquent load instruction. For example, at least one embodiment of the system 100, 200 that performs the method 700 includes an architecture, such as that of the Itanium processor family available from Intel Corporation, that supports load acquire semantics.

For such a processor, semantics used for a memory instruction, such as a load instruction, establish ordering of the memory instruction with respect to other memory instructions, in a processor that supports out-of-order execution of memory instructions. "Acquire" semantics, when used with a memory instruction, indicate that the instruction is made visible to a program prior to subsequent orderable instructions. According to such "acquire" semantics, a processor may speculatively issue a load instruction with acquire semantics (i.e., "ld.acq") into the memory system if and only if the load instruction does not appear to a program to pass other subsequent orderable instructions.

Thus, at least one embodiment of "acquire" semantics includes an instruction format, "ld.acq", which indicates that a load instruction should be filled from shared coherent data. The helper threading logic 130 thus issues, at block 706, the missed load instruction as a ld.acq instruction regardless of the load instruction's original semantic encoding (i.e., regular load instruction vs. ld.acq instruction). This semantic encoding at block 706 effectively causes the interconnect 110 to treat the load miss of a core 104a as a load on shared coherent data and thus triggers helper threading logic 130 that allows a peer core to supply the requested data from its private data cache. In this manner, the cache miss can be serviced more quickly than if the requested data is retrieved from the shared memory system 150.

The effect of turning a missing load instruction from the main core 104a to a coherent load instruction (i.e., ld.acq) may be achieved via software, hardware, or a hybrid of both. For a software scheme, any helper thread may be generated (via dynamic p-slice computation or by hand-generation) to explicitly encode the delinquent load instruction as a coherent load instruction. In addition, the thread may explicitly encode as coherent instructions any other memory instructions on intermediate data structures, used in calculating the load address for the delinquent load instruction, that have global observability. For such a software approach, existing hardware support for cache coherence protocols may achieve the effect of cross-feeding.

Alternatively, the effect of turning a missing load instruction from the main core 104a to a coherent load instruction (i.e., ld.acq) may be achieved via hardware that supports a coherence protocol, such as the MESI (modified, exclusive, shared, invalid) protocol. For such embodiment, the core 104 hardware also supports a help mode. The help mode may be used as a hint to the core 104 that a load miss should be filled from shared coherent data (i.e., treated as a coherent load instruction, ld.acq). The hint may indicate that an off-core request for missed data should be treated as a request to fill the requested data into the private cache of the requesting core in a shared state. Upon a subsequent miss of the same data (load miss on the same memory address) by a second core, the first core may provide the requested fill data to the second core in a shared state, assuming that the second missing load instruction is treated as a coherent load instruction.

The method 700 effectively pools the L2 caches of the cores in the peer group into a non-inclusive cache. This conceptual non-inclusive cache is searched concurrently with the shared memory system 150. A hit in the non-inclusive cache (that is, a hit in the private L2 cache of any core in the peer group) may return the fill data more quickly than a hit in the shared memory system 150. In this manner, a core 104a that suffers a cache miss may utilize some capacity from neighboring cores, thus reducing the effective L2 miss penalty for the prefetched data (assuming L2 lookup time is shorter than shared memory lookup time). In other words, helper cores 104 hoard the prefetched data in their own private caches and deliver the prefetched data to the main core 104a only when the main core 104a requests it.

The shared memory system 150 is searched concurrently with the peer L2 caches in case the requested data is not available in a peer core's L2 cache. Accordingly, FIG. 7 illustrates that, at block 708, the requested data is also requested from the shared memory system 150 concurrently with the peer-to-peer request issued at block 706. In this manner, the miss data is requested from the shared memory system 150 in case the data cannot be filled from the private cache of one of the peer cores. For at least one embodiment, blocks 706 and 708 are performed via submission of a single request to the interconnect 110. In response to the request (such as a load request with acquire semantics), both the shared memory system 150 as well as peer cores 104x-104n are notified 706, 708, respectively, of the data request submitted by the core that has experienced a cache miss.

At blocks 710 and 714 the data request is serviced from a peer core if a peer core has the data available in its private cache. At block 710 it is determined whether there has been a hit in the private L2 cache 109 for any of the peer cores 104a-104n. For at least one embodiment, processing relevant to determining 710 whether data is available in a peer core's private L2 cache 109 is performed by that peer core's cache controller 105.

A cache controller 105 determines whether the requested data is present in the private L2 cache 109 for the core and is available to be shared. If so, the cache controller 105 indicates to the interconnect 110 that a hit has occurred. This "hit" indication is examined at block 710. If a hit is identified at block 710, then the fill data is retrieved 714 from the private L2 cache 109 of the helper core that indicated the hit. Processing then proceeds to block 716.

As is discussed in further detail below, speculative threads generated for the data prefetching do not generally include store instructions. Accordingly, a helper core's private data cache is unlikely to maintain prefetched data having an "exclusive" or "modified state" according to the MESI cache coherence protocol. Thus, if the requested data has been prefetched into a helper core's private cache, the data is likely available to be shared with another core in accordance with block 714 of the method 700.

If it is determined at block 710 that none of the peer cores have the requested data available in their private caches, then the data is retrieved 712 from the shared memory system 150. Processing then proceeds to block 716.

At block 716, the fill data (which has either been retrieved 714 from the private cache of a helper core or has been retrieved 712 from the shared memory system 150) is provided to the main core 104a. Although the illustrative embodiment in FIG. 7 shows the main core 104 as having suffered the cache miss, one of skill in the art will recognize that the miss may occur on any core in the peer group. Processing then ends at block 718.

Traditional software program parallelization techniques do not perform well for irregular or non-numerical applications such as those that require accesses to memory based on linked list structures. In such cases, the memory location to be accessed (for instance, by a load instruction) cannot be easily predicted by traditional stride-based prefetching approaches.

For at least one embodiment, the helper threads discussed herein utilize the software program itself to predict the address for a memory fetch. As is discussed above, the methods 300, 500, 700 contemplate the utilization otherwise idle cores to execute speculative threads, referred to as helper threads, to prefetch data on behalf of the main thread so that memory miss latency can be masked. The prefetching helper threads target pointer-chasing memory access instructions from the main thread that are difficult to handle with traditional hardware or software prefetching techniques. For most software programs, only a small number of static load instructions, referred to as delinquent load instructions, are responsible for the vast majority of data cache misses.

For at least one embodiment, the helper thread represents a subset of the instructions from the main thread program executed by the main core. The subset of instructions in the helper thread are such that the helper thread contains a reduced set of instructions to compute the address of a future memory access in the main thread. The helper thread computes the address of the data required by the main thread and fetches the address from memory (or a higher-level cache) into a lower memory level in time to prevent a cache miss in the main thread.

Methods 300, 500 assume that the cache misses detected at blocks 304 and 504, respectively, are generated during execution of a delinquent load instruction on a helper core. Similarly, it is assumed that cache miss 704 illustrated in FIG. 7 is generated either by execution of a helper thread instruction on a helper core or is generated by execution of the delinquent load instruction on the main core. For the latter embodiment, it is expected that the fill data has been prefetched into the private data cache of a helper core during prior execution of the delinquent load instruction by a helper thread.

Methods 300, 500 and 700 further assume that the helper threads include precomputation slices, referred to as p-slices. A p-slice includes dependent instructions that compute the address accessed by a delinquent load instruction. Execution of such p-slices by helper cores address accuracy of the data prefetched by a helper thread. For at least one embodiment, p-slices are generated such that they do not include any store instructions from the main thread. P-slices may be hand-generated. In addition to, or as an alternative to, hand-generation, p-slices may also be generated dynamically by a compiler.

To address timeliness of the data prefetched by a helper thread, at least one embodiment of each of the methods 300, 500, 700 assumes careful placement of one or more trigger commands into the code of the main thread; each trigger command spawns a helper thread. Triggers are placed such that, when helper threads are spawned to execute the p-slice and perform prefetches for the delinquent load instruction, the helper thread performs such prefetching before the main thread executes the delinquent load instruction. The triggers are thus placed prior to the delinquent load instruction in the main thread.

The triggers are placed such that they neither run too far ahead, nor run behind, the main thread's execution of the delinquent load instruction. It is sometimes desirable to optimize the helper thread in order provide enough slack to allow the helper thread to execute in time to prevent a cache miss in the main thread. This optimization may take the form of additional helper threads in an approach referred to herein as "chained speculative precomputation" or "chained SP."

It is assumed that a trigger instruction to cause a speculative helper thread to be spawned has been inserted into the main thread code at one or more appropriate spawning point(s). The trigger instruction can be a conventional instruction in the existing instruction set of a processor, denoted with special marks (or "hints"), such as a special offset (or immediate) value for the NOP instruction, assuming that a particular processing system will recognize the hint as a fork or spawn instruction. Alternatively, the trigger instruction can be a special dedicated instruction such as a fork or spawn instruction.

The foregoing discussion discloses selected embodiments of an apparatus, system and methods for facilitating affinity-guided speculative helper threads in a chip multiprocessor. The methods described herein may be performed on a processing system such as the processing systems 100, 200 illustrated in FIGS. 1 and 2.

FIGS. 1 and 2 each illustrate at least one embodiment of a processing system 100, 200, respectively, that may utilize disclosed techniques. Systems 100, 200 may be used, for example, to execute one or more methods that for prefetching data via speculative helper threads, such as the embodiments described herein. For purposes of this disclosure, a processing system includes any chip multiprocessor system that has two or more processors, such as, for example; a digital signal processor (DSP), a microcontroller, an application specific integrated circuit (ASIC), or a microprocessor. Systems 100 and 200 are representative of processing systems based on the Itanium® and Itanium® II microprocessors as well as the Pentium®, Pentium® Pro, Pentium® II, Pentium® III, Pentium® 4 microprocessor, all of which are available from Intel Corporation. Other systems (including personal computers (PCs) having other microprocessors, engineering workstations, personal digital assistants and other hand-held devices, set-top boxes and the like) may also be used. At least one embodiment of systems 100 and 200 may execute a version of the Windows™ operating system available from Microsoft Corporation, although other operating systems and graphical user interfaces, for example, may also be used.

Processing systems 100 and 200 each include a memory 102 and two or more processors 104a-104n. Memory 102 may store instructions 140 and data 141 for controlling the operation of the processors 104a-104n. Memory 102 is intended as a generalized representation of memory and may include a variety of forms of memory, such as a hard drive, CD-ROM, volatile random access memory (RAM), dynamic random access memory (DRAM), static random access memory (SRAM), flash memory and related circuitry. Memory 102 may store instructions 140 and/or data 141 represented by data signals that may be executed by one or more of the processors 104a-14n.

Processing systems 100, 200 include helper threading logic 130 to perform one or more of the data prefetching methods 300, 500, 700 discussed above. For at least one embodiment, helper threading logic 130 is included in the on-chip interconnect 130.

In the preceding description, various aspects of a method, apparatus and system for performing data prefetching via speculative helper threads in a CMP system are disclosed. For purposes of explanation, specific numbers, examples, systems and configurations were set forth in order to provide a more thorough understanding. However, it is apparent to one skilled in the art that the described method and apparatus may be practiced without the specific details. It will be obvious to those skilled in the art that changes and modifications can be made without departing from the present invention in its broader aspects.

For instance, it is not necessary that only one of the prefetching methods 300, 500, 700 be practiced by a given CMP system, such as systems 100 and 200 illustrated in FIGS. 1 and 2. Instead, hybrid schemes may be employed to practice two or more of the methods 300, 500, 700 in the same system 100, 200. For example, a single system 100, 200 may employ a combination of the cross-feeding method 700 and the unicast method 500. Similarly, a single system 100, 200 may employ a combination of the cross-feeding method 700 with the broadcast method 300. The latter approach conceptually pools the L2 caches 109 of helper cores to hoard prefetched data and makes the pooled data available to serve the main core's L2 109 cache on demand.

For at least one embodiment, the combination approach may be based on the scale of the CMP interconnection network. For example, for topologically remote affinity groups, a combination of peer-to-peer feeding and unicasting may prove more efficient than either single approach.

Also, for example, the combination of methods 300, 500 and/or 700 to be used by a system 100, 200 at any given time may be adaptively determined. For at least one embodiment, the adaptation is enabled based on dynamic monitoring of interconnection 110 network bandwidth consumption. Alternatively, the adaptation may be statically enabled. Static or dynamic adaptation may be enabled via a user, an operating system, or by execution of helper thread programming logic embedded into the helper threads by a compiler.

Also, for example, any or all of the prefetching methods 300, 500, 700 discussed herein may be performed on a system 200 such as that illustrated in FIG. 3. For such system 200, the methods 300, 500, 700 attempt to retrieve fill data from a shared L2 cache 209 before resorting to access to a shared memory system 150.

While particular embodiments of the present invention have been shown and described, the appended claims are to encompass within their scope all such changes and modifications that fall within the true scope of the present invention.

What is claimed is:

1. An apparatus comprising:
    a first processor to execute a main thread instruction stream that includes a delinquent instruction, wherein the first processor is to be associated with a first private cache;
    a second processor to execute a helper thread instruction stream that includes a subset of the main thread instruction stream in response to execution of a trigger instruction from the main thread, wherein the subset includes the delinquent instruction, and wherein the second processor is to be associated with a second private cache;
    a shared memory system coupled to said first processor and to said second processor; and
    control logic to push, responsive to a miss of requested data for the delinquent instruction in the second private cache associated with the second processor, the requested data to the first private cache associated with the first processor.

2. The apparatus of claim 1, wherein: the first processor, second processor and logic are included within a chip package, and wherein the shared memory system includes a shared cache.

3. The apparatus of claim 1, further comprising retrieval logic coupled to the control logic to retrieve the requested data from the shared memory system in response to the miss of the requested data for the delinquent instruction in the second private cache.

4. The apparatus of claim 3, wherein: the control logic to push, responsive to a miss of requested data for the delinquent instruction in the second private cache, the requested data to the first private data cache of the first processor comprises broadcasting the requested data to an affinity group of processors including at least the first processor.

5. The apparatus of claim 3, wherein: the control logic to push, responsive to a miss of requested data for the delinquent instruction in the second private cache, the requested data to the first private data cache of the first processor comprises unicasting the requested data to the first processor.

6. The apparatus of claim 1, wherein: the control logic is further to provide the requested data from the shared memory system to the second private data cache associated with the second processor.

7. A processor comprising:
    a first processor core to be associated with a first private cache and to execute a first thread;
    a second processor core to be associated with a second private cache and to execute a second speculative thread, the second speculative thread to include a load instruction from the first thread that a miss to the first private cache is anticipated during execution of the first thread, wherein the first processor core is further to trigger the second processor core's execution of the second speculative thread responsive to execution of a trigger instruction in the first thread with the first processor core; and
    logic to retrieve data for the load instruction from a higher level memory and to provide the data to the first private cache associated with the first processor core in response to a miss to the second private cache responsive to execution of the load instruction in the second speculative thread with the second processor core.

8. The processor of claim 7, wherein: the logic to retrieve data for the load instruction from a higher level memory and to provide the data to the first private cache comprises in response to a miss to the second private cache responsive to execution of the load instruction in the second speculative thread with the second processor core comprises the logic to
    retrieve the data in response to the miss to the second private cache responsive to execution of the load instruction in the second speculative thread with the second processor, and
    broadcast the data to private caches associated with an affinity group of processor cores, the affinity group of processor cores including at least the first processor core.

9. The processor of claim 7, wherein: the logic to retrieve data for the load instruction from a higher level memory and to provide the data to the first private cache comprises in response to a miss to the second private cache responsive to execution of the load instruction in the second speculative thread with the second processor core comprises the logic to
    retrieve the data in response to the miss to the second private cache responsive to execution of the load instruction in the second speculative thread with the second processor, and
    unicast the data to the first private cache associated with the first private core.

10. The processor of claim 7, wherein: the higher-level memory includes a memory coupled external to the processor.

11. An apparatus comprising:
    a first processor to execute a main thread instruction stream that includes a delinquent load instruction, wherein the first processor is to be associated with a first data cache;
    a second processor to execute a helper thread instruction stream that includes a subset of the main thread instruction stream, wherein the subset includes the delinquent load instruction, and wherein the second processor is to be associated with a second data cache, and wherein the first processor is further to trigger the second processor's execution of the helper thread instruction stream responsive to a trigger instruction in the main thread instruction stream;
    retrieval logic to retrieve, responsive to a miss of requested data for the delinquent load instruction in the second data cache, the requested data; and
    control logic to provide the requested data to the first data cache associated with the first processor in response to the retrieval logic retrieving the requested data and without a request from the first processor.

12. The apparatus of claim 11, further comprising: a third processor and a shared memory system coupled to said first processor, said second processor, and said third processor.

13. The apparatus of claim 12, wherein: retrieval logic to retrieve, responsive to a miss of requested data for the delinquent load instruction in the second data cache, the requested data comprises:
    the retrieval logic, responsive to the miss of requested data for the delinquent load instruction in the second data cache, to issue a snoop for the requested data to a third data cache associated with the third processor, and the third data cache to provide the requested data to the retrieval logic in response to receiving the snoop issued from the retrieval logic.

14. The apparatus of claim 13, wherein: the retrieval logic to retrieve, responsive to a miss of requested data for the delinquent load instruction in the second data cache, the requested data further comprises:

the retrieval logic, responsive to the miss of requested data for the delinquent load instruction in the second data cache, to request the requested data from the shared memory system concurrently with issuing the snoop to the third data cache; and the retrieval logic to receive the requested data from the shared memory system in response to a miss of the requested data in the third data cache.

15. The apparatus of claim 12, wherein: the first, second, and third processors each include a processor core on a single package, and wherein the shared memory system includes a shared higher-level cache.

16. A method comprising:

executing a main thread including a load instruction and a trigger instruction with a first core, the first core associated with a first private cache;

executing a helper thread with a second core in response to executing the trigger instruction with the first core;

missing a second private cache associated with the second core in response to executing the load instruction within the helper thread with the second core; and prefetching load data for the load instruction into the first private cache responsive to missing the second private cache in response to executing the load instruction within the helper thread with the second core.

17. The method of claim 16, wherein prefetching the load data for the load instruction into the first private cache further comprises:

retrieving the load data from a shared memory system; and broadcasting the load data to an affinity group of cores including at least the first core in response to retrieving the load data from the shared memory system.

18. The method of claim 16, further comprising:

providing the load data for the load instruction from a shared memory system into the second private cache associated with the second core.

19. The method of claim 16, further comprising:

providing the load data for the load instruction from a shared memory system into a private cache for each of a plurality of helper cores including the second core.

20. The method of claim 16, wherein prefetching the load data for the load instruction into the first private cache further comprises:

retrieving the load data from a third private cache associated with a third core; and providing the load data to the private cache associated with the first core in response to retrieving the load data from a third private cache.

21. The method of claim 16, wherein prefetching the load data for the load instruction into the first private cache further comprises: concurrently:

broadcasting a request for the load data to each of a plurality of cores; and requesting the load data from a shared memory system.

22. The method of claim 21, wherein prefetching the load data for the load instruction into the first private cache further comprises:

providing, if the load data is available in a private cache of one of the plurality of cores, the load data to the main core from the private cache of one of the plurality of cores; and providing, if the load data is not available in a private cache of one of the plurality of cores, the load data to the main core from the shared memory system.

23. An article comprising:

a machine-readable storage medium having a plurality of machine accessible instructions, which if executed by a machine, cause the machine to perform operations comprising:

determining that a helper core has suffered a miss in a helper private cache for a load instruction from a main thread executing on a main core while executing a helper thread, wherein the helper thread is to be spawned on the helper core in response to the main core executing a trigger instruction from the main thread; and fetching load data for the load instruction in response to determining the helper core has suffered the miss in the helper private cache for the load instruction; and pushing, unsolicited from the main core, the load data into a main private cache of the main core in response to fetching the load data for the load instruction.

24. The article of claim 23, wherein: fetching load data for the load instruction in response to determining the helper core has suffered the miss in the helper private cache for the load instruction comprises: retrieving the load data from a shared memory system in response to determining the helper core has suffered the miss in the helper private cache for the load instruction; and wherein pushing, unsolicited from the main core, the load data into a main private cache of the main core in response to fetching the load data for the load instruction comprises: broadcasting the load data to an affinity group of private caches of an affinity group of cores including the main private cache of the main core.

25. The article of claim 23: fetching load data for the load instruction in response to determining the helper core has suffered the miss in the helper private cache for the load instruction comprises: retrieving the load data from a shared memory system in response to determining the helper core has suffered the miss in the helper private cache for the load instruction; and wherein pushing, unsolicited from the main core, the load data into a main private cache of the main core in response to fetching the load data for the load instruction comprises: unicasting the load data to the main private cache of the main core.

26. The article of claim 23, further comprising: a plurality of machine accessible instructions, which if executed by a machine, cause the machine to perform operations comprising: providing load data for the load instruction from a shared memory system into the private cache for each of a plurality of helper cores including the helper private cache of the helper core.

27. The article of claim 23, wherein: fetching load data for the load instruction in response to determining the helper core has suffered the miss in the helper private cache for the load instruction comprises: retrieving the load data from an additional helper private cache of an additional helper core.

28. A system comprising:

a memory system;

a first processor, coupled to the memory system, to execute a first instruction stream;

a second processor, coupled to the memory system, to concurrently execute a second instruction stream in response to the first processor executing a trigger instruction from the first instruction stream to spawn the second instruction stream; and helper threading logic to push fill data to a first private cache of the first processor, the fill data to be prefetched by the second processor and to be pushed to the first private cache before a request for the fill data is issued by the first processor.

29. The system of claim 28, wherein: the helper threading logic is further to push the fill data to the first private cache of the first processor from a second private cache of the second processor.

30. The system of claim 28, wherein: the helper threading logic is further to push the fill data to the first private cache of the first processor from the memory system.

31. The system of claim 28, wherein the first processor and the second processor are each processor cores, and wherein the first processor core, the second processor core, and the helper threading logic are included in a single processor package coupled to the memory system.

32. The system of claim 31, wherein: the memory system includes a cache that is shared by the first and second processor cores coupled to a dynamic random access memory.

* * * * *